United States Patent
Ye et al.

(10) Patent No.: US 12,249,029 B2
(45) Date of Patent: Mar. 11, 2025

(54) METHOD AND SYSTEM FOR DISPLAYING VIRTUAL SPACE AT VARIOUS POINT-IN-TIMES

(71) Applicant: LINE Plus Corporation, Seongnam-si (KR)

(72) Inventors: So Jin Ye, Seongnam-si (KR); Juhee Kim, Seongnam-si (KR); Ki Ho Park, Seongnam-si (KR); Jae Wook Song, Seongnam-si (KR); Kang Su Shin, Seongnam-si (KR); Jun Ho Lee, Seongnam-si (KR); Ha Jin Lee, Seongnam-si (KR); Won Jean Jo, Seongnam-si (KR); Si Hyun Jin, Seongnam-si (KR); Baek Bum Pyun, Seongnam-si (KR)

(73) Assignee: Line Plus Corporation, Seongnam-si (KR)

( * ) Notice: Subject to any disclaimer, the term of this patent is extended or adjusted under 35 U.S.C. 154(b) by 152 days.

(21) Appl. No.: 18/148,208

(22) Filed: Dec. 29, 2022

(65) Prior Publication Data

US 2023/0215090 A1    Jul. 6, 2023

(30) Foreign Application Priority Data

Jan. 3, 2022   (KR) .................. 10-2022-0000291

(51) Int. Cl.
*G06T 17/00* (2006.01)
*G06F 3/04815* (2022.01)
*G06F 3/04842* (2022.01)
*G06F 3/16* (2006.01)

(52) U.S. Cl.
CPC .......... *G06T 17/00* (2013.01); *G06F 3/04815* (2013.01); *G06F 3/04842* (2013.01); *G06F 3/165* (2013.01)

(58) Field of Classification Search
None
See application file for complete search history.

(56) References Cited

U.S. PATENT DOCUMENTS

| 2011/0078151 | A1* | 3/2011 | Bilbrey | G06F 16/68 707/E17.014 |
| 2011/0210962 | A1* | 9/2011 | Horan | G06T 19/003 715/757 |
| 2022/0138856 | A1* | 5/2022 | Ahlstrom | G06F 16/245 705/36 R |

* cited by examiner

*Primary Examiner* — Frank S Chen
(74) *Attorney, Agent, or Firm* — Harness, Dickey & Pierce, P.L.C.

(57) ABSTRACT

A method for displaying a virtual space at various point-in-times is provided, which is performed by one or more processors and includes displaying a user's avatar on a current first virtual space, in response to receiving a first user input selecting a first graphical object associated with a movement between point-in-times, displaying a user interface including a plurality of point-in-time information associated with the first virtual space, receiving, from a user, a selection of a first point-in-time from among the plurality of point-in-time information, and playing back a first event associated with the first virtual space recorded at the first point-in-time.

17 Claims, 9 Drawing Sheets

METHOD AND SYSTEM FOR DISPLAYING VIRTUAL SPACE AT VARIOUS POINT-IN-TIMES

CROSS-REFERENCE TO RELATED APPLICATION

This application claims priority under 35 U.S.C. § 119 to Korean Patent Application No. 10-2022-0000291, filed in the Korean Intellectual Property Office on Jan. 3, 2022, the entire contents of which are hereby incorporated by reference.

TECHNICAL FIELD

The present disclosure relates to a method and/or a system for displaying a virtual space at various point-in-times. For example, at least some example embodiments relate to a method and/or a system for displaying a virtual space at a past point-in-time and/or a future point-in-time via a user interface associated with a movement between point-in-times.

BACKGROUND

With the development of the technology of virtual reality and augmented reality, more and more companies are using a metaverse for remote work, in which the metaverse is a virtual space, for example, a three dimensional (3D) virtual space, where activities, for example social and economic activities, as in the real world are commonly performed. By communicating with other people using avatars in the virtual space in which a real-world space, for example, a virtual representation of a real world office space is implemented within the 3D virtual space, various interactions between people can be performed within the virtual space.

In the future, as the remote work using the metaverse is expected to gradually increase, there is a need to record data associated with the various interactions between people within the virtual space. In addition, when planning an event using the virtual space, it may be desirable to check the future virtual space where the event is scheduled. However, since the current virtual space including the metaverse is performed in real time, there is a problem in that it is difficult to provide the past interaction data or information on the virtual space in the future.

SUMMARY

In order to address one or more problems (e.g., the problems described above and/or other problems not explicitly described herein), the present disclosure provides a method for, a non-transitory computer-readable recording medium storing instructions for, and/or an apparatus (system) for displaying a virtual space at various point-in-times.

Technical Solution

The present disclosure may be implemented in a variety of ways, including a method, an apparatus (system), or a non-transitory computer-readable storage medium storing instructions.

According to various examples of the present disclosure, there is provided a method of displaying a virtual space at various point-in-times using one or more processors of a user terminal.

In some example embodiments, the method includes displaying a user's avatar on a first virtual space; displaying a user interface including a plurality of point-in-time information associated with the first virtual space, in response to receiving a first user input selecting a first graphical object associated with a movement between the various point-in-times; receiving, from a user, a selection of a first point-in-time from among the plurality of point-in-time information; and replaying a first event associated with the first virtual space recorded at the first point-in-time, the first event including the first virtual space recorded at the first point-in-time and motion data for a first set of avatars in the first virtual space.

In some example embodiments, the first point-in-time is a past point-in-time occurring prior to a current point-in-time, and the displaying the user interface includes displaying the user interface such that the user interface includes therein date information of the first point-in-time and a first set of keywords associated with the first virtual space at the first point-in-time.

In some example embodiments, the method further includes extracting the first set of keywords from one or more of voice data or text data included in a first set of the motion data in the first virtual space recorded at the first point-in-time.

In some example embodiments, the replaying comprises: displaying each of the first set of keywords in different sizes on the user interface according to a frequency of mention.

In some example embodiments, the replaying the first event comprises: replaying the first event within a defined area within the first virtual space with the user's avatar displayed within the first virtual space outside of the defined area such that the user's avatar appears to be watching the first event being played back in the defined area in the first virtual space.

In some example embodiments, the replaying the first event comprises: displaying the first virtual space recorded at the first point-in-time and the motion data for the first set of avatars in the first virtual space, together with the user's avatar.

In some example embodiments, the first set of avatars includes a first avatar and a second avatar, and the replaying comprises: adjusting an output volume of voices of the first avatar and the second avatar based on a distance between the user's avatar and respective ones of the first avatar and the second avatar.

In some example embodiments, the method further includes receiving, from the user, a selection of a second point-in-time from among the plurality of point-in-time information associated with the first virtual space; and displaying a second set of avatars associated with an expected participant at the second point-in-time, on the first virtual space associated with the second point-in-time.

In some example embodiments, the second point-in-time is associated with a scheduled second event scheduled to occur after a current point-in-time, and the displaying the user interface comprises: displaying, on the user interface, date information of the second point-in-time and a second set of keywords associated with the scheduled second event.

In some example embodiments, the method further includes replaying another event associated with a second virtual space recorded at the first point-in-time, in response to receiving a user input selecting a graphical object associated with a movement to the second virtual space during the replaying of the first event, the another event including the second virtual space recorded at the first point-in-time and motion data for another set of avatars in the second virtual space.

In some example embodiments, the method further includes determining whether the user has user rights associated with switching between virtual spaces; and activating the graphical object associated with the movement to the second virtual space, in response to the user input selecting the graphical object associated with the movement to the second virtual space during the replaying of the first event, if the user has the user rights associated with switching between the virtual spaces.

In some example embodiments, the method further includes initiating recording of the first virtual space and motion data of a set of avatars in the first virtual space, in response to receiving a user input selecting a graphical object associated with an event recording.

In some example embodiments, the method further includes determining whether the user has user rights associated with the event recording; and activating the graphical object associated with the event recording, only if the user has the user rights associated with the event recording.

Some example embodiments are directed to a non-transitory computer-readable recording medium storing instructions that, when executed by one or more processors, cause performance of the method of displaying a virtual space at various point-in-times using one or more processors of a user terminal.

Some example embodiments are directed to a user terminal.

In some example embodiments, the user terminal includes a communication device; a memory; and one or more processors connected to at least the memory, the one or more processors configured to execute one or more computer-readable programs included in the memory to configure the user terminal to display a virtual space at various point-in-times by, displaying a user's avatar on a first virtual space, displaying a user interface including a plurality of point-in-time information associated with the first virtual space, in response to receiving a first user input selecting a first graphical object associated with a movement between the various point-in-times, receiving, from a user, a selection of a first point-in-time from among the plurality of point-in-time information, and replaying a first event associated with the first virtual space recorded at the first point-in-time, the first event including the first virtual space recorded at the first point-in-time and motion data for a first set of avatars in the first virtual space.

In some example embodiments, the first point-in-time is a past point-in-time occurring prior to a current point-in-time, and the user terminal is configured to display the user interface such that the user interface includes therein date information of the first point-in-time and a first set of keywords associated with the first virtual space at the first point-in-time.

In some example embodiments, the one or more processors are configured to execute the one or more computer-readable programs to further configure the user terminal to, receive, from the user, a selection of a second point-in-time from among the plurality of point-in-time information associated with the first virtual space, and display a second set of avatars associated with an expected participant at the second point-in-time, on the first virtual space associated with the second point-in-time.

In some example embodiments, the second point-in-time is associated with a scheduled second event scheduled to occur after a current point-in-time, and the user interface is configured to display date information of the second point-in-time and a second set of keywords associated with the scheduled second event.

In some example embodiments, the one or more processors are configured to execute the one or more computer-readable programs to further configure the user terminal to, replay another event associated with a second virtual space recorded at the first point-in-time, in response to receiving a user input selecting a graphical object associated with a movement to the second virtual space during the replaying of the first event, the another event including the second virtual space recorded at the first point-in-time and motion data for another set of avatars in the second virtual space.

In some example embodiments, the one or more processors are configured to execute the one or more computer-readable programs to further configure the user terminal to initiate recording the first virtual space and motion data of a set of avatars in the first virtual space, in response to receiving a user input selecting a graphical object associated with an event recording.

According to some examples, by providing an event associated with a virtual space recorded at a past point-in-time through a user interface associated with a movement between point-in-times, it is possible to check the content of the conversation (voice or text) and the non-verbal action of the avatar of a meeting held in the virtual space in the past, and increase the utilization of the virtual space.

According to some examples, by providing a virtual space associated with an event scheduled at a future point-in-time through a user interface associated with the movement between point-in-times, it is possible to check and adjust in advance expected participants and configuration of a virtual space associated with an event scheduled in the future, and efficiently perform remote work using the virtual space.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary examples thereof with reference to the accompanying drawings, in which.

DETAILED DESCRIPTION

Figure 1:
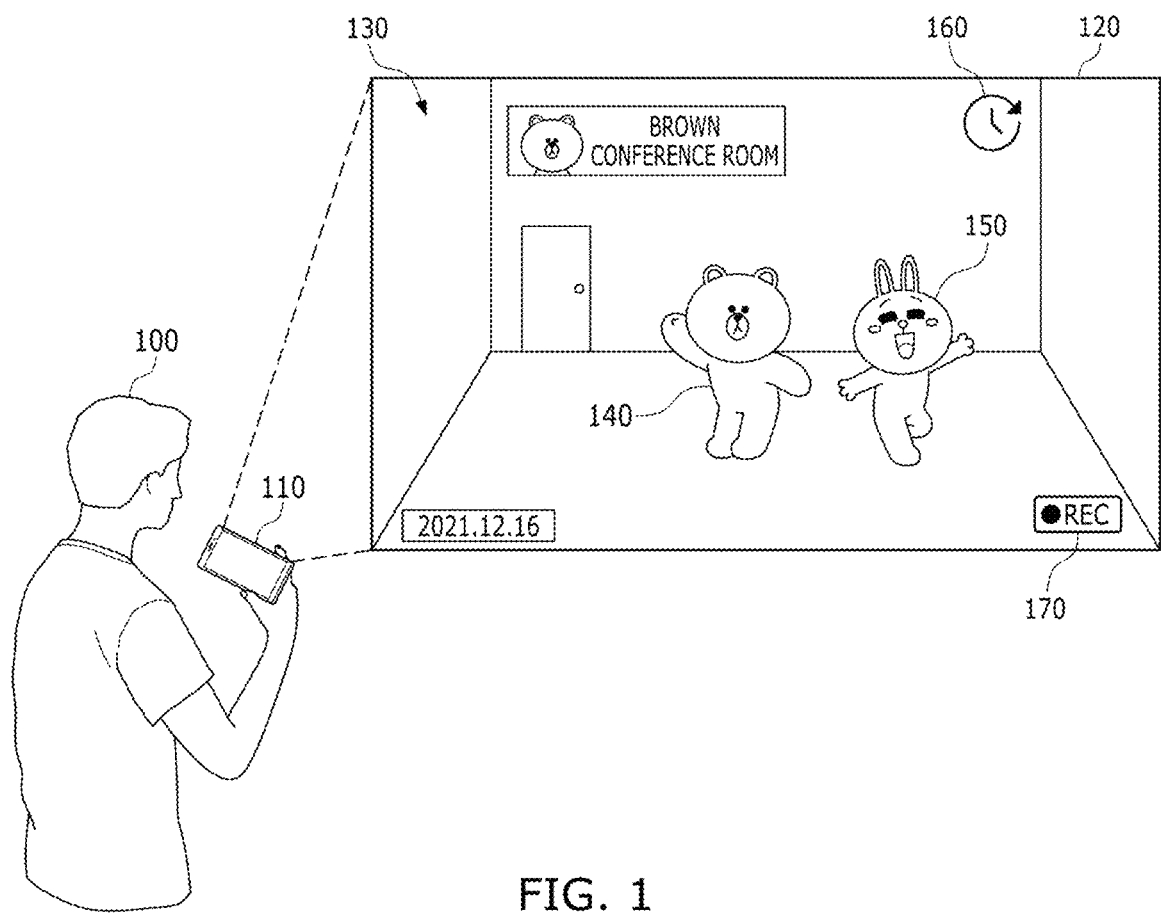
FIG. 1 is a diagram illustrating an example of a virtual environment displaying avatars and a virtual space provided through a user terminal.

Hereinafter, examples for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the invention to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, a "user" may refer to a user of a virtual environment application or a user account of the virtual environment application. In this example, the user account may represent an account generated and used by the user in the virtual environment application or data related thereto.

In the present disclosure, an "avatar" may be a character representing a user in a virtual environment application, and may be defined by an eye shape, a nose shape, a mouth shape, a face shape, a body type, a hair style, and the like.

In the present disclosure, a "virtual space" may refer to a virtual space which may be generated in a virtual environment application installed on a computing device and in which one or more users (or user accounts) may participate. An avatar of the user may be moved in the virtual space, and various types of messages, voice data, and the like may be exchanged between the avatars in the virtual space. The virtual space may be output through a display of the computing device, and the display may be a monitor, an AR device, a VR device, or the like.

In the present disclosure, "motion of avatar" or "motion data of avatar" may refer to movement or data associated with the movement that can be expressed through body parts (head, arm, leg, body, joint, facial expression, and the like)

of the user avatar. The motion data of the avatar may include voice data or text data input from a user associated with the avatar.

FIG. 1 is a diagram illustrating an example of a virtual environment displaying avatars and a virtual space provided through a user terminal.

Referring to FIG. 1, a user 100 may be provided with a virtual environment screen 120 displaying the user's avatar 140 in a virtual space 130 at a current point-in-time (that is, in the present) on a display of a user terminal 110. One or more avatars including the user's avatar 140 may be displayed in the virtual space 130 at the current point-in-time, and as shown in the illustrated example, the user's avatar 140 and another user's avatar 150 may be displayed together. For example, the user 100 may be provided with the virtual environment screen 120 displaying the user's avatar 140 and the other user's avatar 150 in "Brown Conference Room" which is the virtual space 130 at the current point-in-time (e.g., at the time of 2021.12.16).

The user terminal 110 may display, on the screen 120, a graphical object 160 (or alternatively, a graphical icon) associated with a movement between point-in-times. If the user 100 selects the graphical object 160 associated with the movement between point-in-times, a user interface, for example, a graphical user interface (GUI), including a plurality of point-in-time information may be displayed. The user interface including a plurality of point-in-time information will be described elsewhere below with reference to FIG. 4. The user terminal 110 may receive a user selection (e.g., a touch input, or the like) for a specific point-in-time from among a plurality of point-in-time information displayed on the user interface, and display the virtual space at the corresponding point-in-time. For example, if the user 100 selects a past point-in-time from among a plurality of point-in-time information, the user terminal 110 may play back an event associated with the virtual space recorded at the past point-in-time. In another example, if the user 100 selects a specific future point-in-time from among a plurality of point-in-time information, the user terminal 110 may display an avatar and a virtual environment associated with an expected participant in an event associated with the virtual space at the future point-in-time. The graphical object 160 associated with the movement between point-in-times may be activated only by a user who has the user rights associated with playback at different point-in-times.

The user terminal 110 may display, on the screen 120, a graphical object 170 (or alternatively, an icon) associated with an event recording. If the user 100 selects the graphical object 170 associated with the event recording, the user terminal 110 may record the current virtual space and motion data of the avatar in the current virtual space. The graphical object 170 associated with the event recording may be activated if the user has user rights associated with storing the event recording.

With such a configuration, the user 100 may record and play back communication with other users performed in the virtual space. As a result, the user 100 may easily review the records of motions and movements of the avatars, including voice and chat conversations performed with the other users in real time. In addition, the user may design or check in advance the virtual space 130 of a future point-in-time to review the schedule for the virtual space, and check the users expected to be in attendance in the virtual space 130 based on the corresponding schedule. As a result, the user 100 may perform efficient communication in the virtual space of the future point-in-time.

Figure 2:
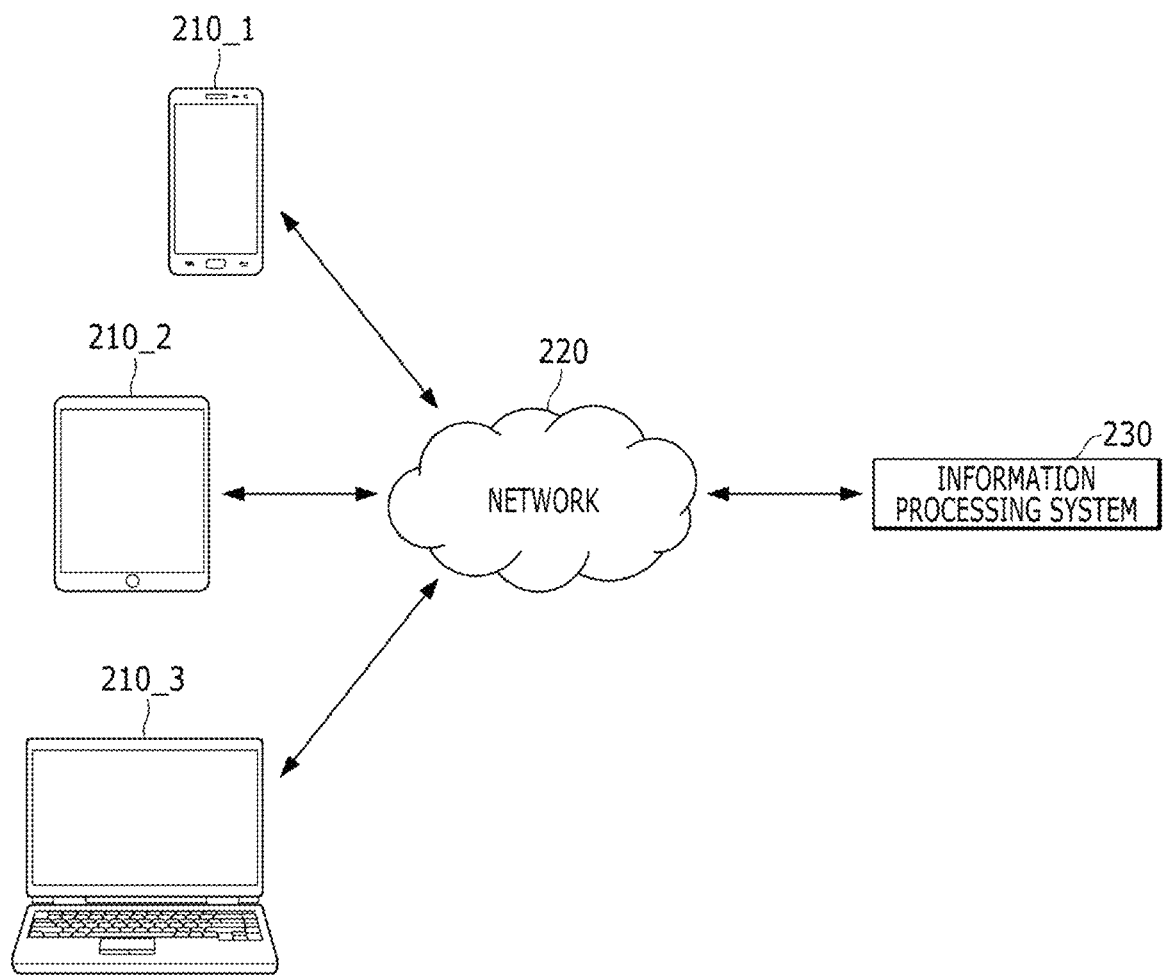
FIG. 2 is a schematic diagram illustrating a configuration in which an information processing system is communicatively connected to a plurality of user terminals.

FIG. 2 is a schematic diagram illustrating a configuration in which an information processing system 230 is communicatively connected to a plurality of user terminals 210_1, 210_2, and 210_3.

Referring to FIG. 2, as illustrated, the plurality of user terminals 210_1, 210_2, and 210_3 may be connected to the information processing system 230 that is capable of providing a virtual environment service through a network 220. In this case, the plurality of user terminals 210_1, 210_2, and 210_3 may include terminals of the users of the virtual environment service. The information processing system 230 may include one or more server devices and/or databases, or one or more distributed computing devices and/or distributed databases based on cloud computing services that can store, provide and execute computer-executable programs (e.g., downloadable applications) and data relating to the provision of virtual environment services and the like.

The virtual environment service provided by the information processing system 230 may be provided to the user through virtual environment applications, web browsers or the like installed in each of the plurality of user terminals 210_1, 210_2, and 210_3. For example, the information processing system 230 may provide corresponding information or perform a corresponding process in response to a request to play back an event associated with a virtual space of a specific point-in-time, and the like received from the user terminals 210_1, 210_2, and 210_3 through the virtual environment application or the like.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but aspects are not limited thereto.

In FIG. 2, a mobile phone terminal 210_1, a tablet terminal 210_2, and a PC terminal 210_3 are illustrated as the examples of the user terminal 110, but aspects are not limited thereto, and the user terminals 210_1, 210_2, and 210_3 may be any computing device that is capable of wired and/or wireless communication and that can be installed with the virtual environment application, the web browser, or the like and execute the same. For example, the user terminal may include an AI speaker, a smart phone, a mobile phone, a navigation, a computer, a notebook, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, and so on. In addition, FIG. 2 illustrates that three user terminals 210_1, 210_2, and 210_3 are in communication with the information processing system 230 through the network 220, but aspects are not limited thereto, and a different number of user terminals may be configured to be in communication with the information processing system 230 through the network 220.

The information processing system 230 may receive, from one or more of the user terminals 210_1, 210_2, and 210_3, a request to play back an event associated with a virtual space at a specific point-in-time. The information processing system 230 may provide the virtual space at the specific point-in-time and motion data of the avatar associated with the virtual space to the user terminals 210_1, 210_2, and 210_3. In addition, although FIG. 2 illustrates that the information processing system 230 provides the virtual space at the specific point-in-time and the motion data of the avatar associated with the virtual space to the user terminal, aspects are not limited thereto, and hardware/software for providing a virtual environment service may be provided in the user terminal.

Figure 3:
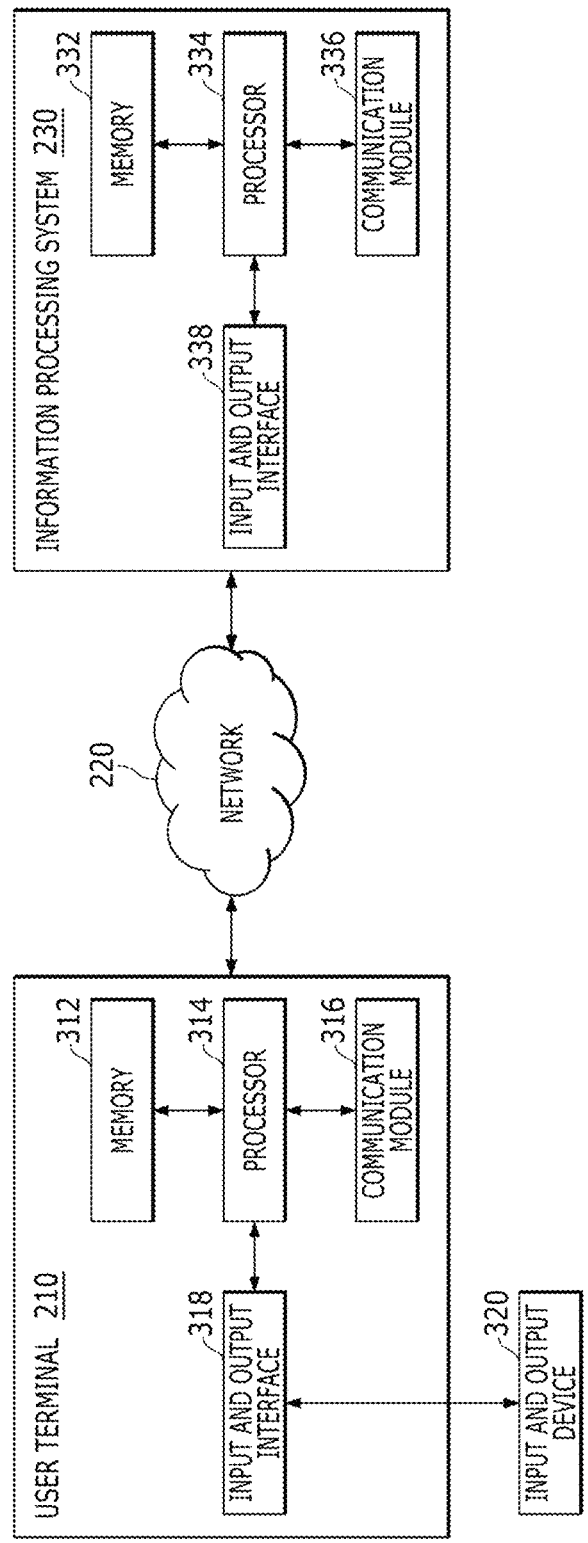
FIG. 3 is a block diagram illustrating an internal configuration of the user terminal and the information processing system.

FIG. 3 is a block diagram illustrating an internal configuration of the user terminal 210 and the information processing system 230.

Referring to FIG. 3, the user terminal 210 may refer to any computing device that is capable of executing the virtual environment application, a web browser, or the like and also capable of wired/wireless communication, and may include the mobile phone terminal 210_1, the tablet terminal 210_2, and the PC terminal 210_3 of FIG. 2, for example.

As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using respective communication modules 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for the virtual environment application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program installed by files provided by developers or a file distribution system that distributes an installation file of an application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

For example, through the execution of the instructions, the processors 314 and 334 may be transformed into special purpose processors to display a virtual space to a user of the user terminal 110, 210, and to allow the user to browse the virtual space at various points-in-time by, for example, replaying events associated with the virtual space recorded at prior points-in-time and/or preview events associated with the virtual space scheduled for later points-in-time.

The special purpose processors may improve the functioning of the user terminal 110, 210 itself by, for example, allowing a user to easily check the topic of conversation and the like at each point-in-time. Therefore, the user terminal 110, 210 may allow the user to easily learn what has occurred in the virtual space by replaying past events within the virtual space and/or better plan their attendance in the virtual space for upcoming events.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to play back an event associated with a virtual space at a specific point-in-time, and the like) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220. For example, the user terminal 210 may receive, from the information processing system 230, a virtual space at a specific point-in-time, motion data of an avatar associated with the virtual space, and the like.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded into the memory 312, a service screen or the like, which is configured with the information and/or data provided by the information processing system 230 or another user terminals, may be displayed on the display through the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device (not illustrated) for inputting or outputting that may be connected to or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may include components generally included in the smartphone. For example, it may be implemented such that various components such as an acceleration sensor, a gyro sensor, an image sensor, a proximity sensor, a touch sensor, an illuminance sensor, a camera module, various physical buttons, buttons using a touch panel, input and output ports, a vibrator for vibration, and so on may be further included in the user terminal 210.

While a program for a virtual environment application or the like that provides virtual space services at various point-in-times is operated, the processor 314 may receive text, image, video, audio, and/or action, and so on inputted or selected through the input device such as a camera, a microphone, and so on, that includes a touch screen, a keyboard, an audio sensor and/or an image sensor connected to the input and output interface 318, and store the received text, image, video, audio, and/or action, and so on in the memory 312, or provide the same to the information processing system 230 through the communication module 316 and the network 220. For example, the processor 314 may receive a user input requesting to play back an event associated with a virtual space at a specific point-in-time, and provide the received user input to the information processing system 230 through the communication module 316 and the network 220.

The processor 314 of the user terminal 210 may be configured to manage, process, and/or store the information and/or data received from the input and output device 320, another user terminal, the information processing system 230 and/or a plurality of external systems. The information and/or data processed by the processor 314 may be provided to the information processing system 230 through the communication module 316 and the network 220. The processor 314 of the user terminal 210 may transmit the information and/or data to the input and output device 320 through the input and output interface 318 to output the same. For example, the processor 314 may display the received information and/or data on a screen of the user terminal.

The processor 334 of the information processing system 230 may be configured to manage, process, and/or store information and/or data received from the plurality of user terminals 210 and/or a plurality of external systems. The information and/or data processed by the processor 334 may be provided to the user terminals 210 through the communication module 336 and the network 220.

Figure 4:
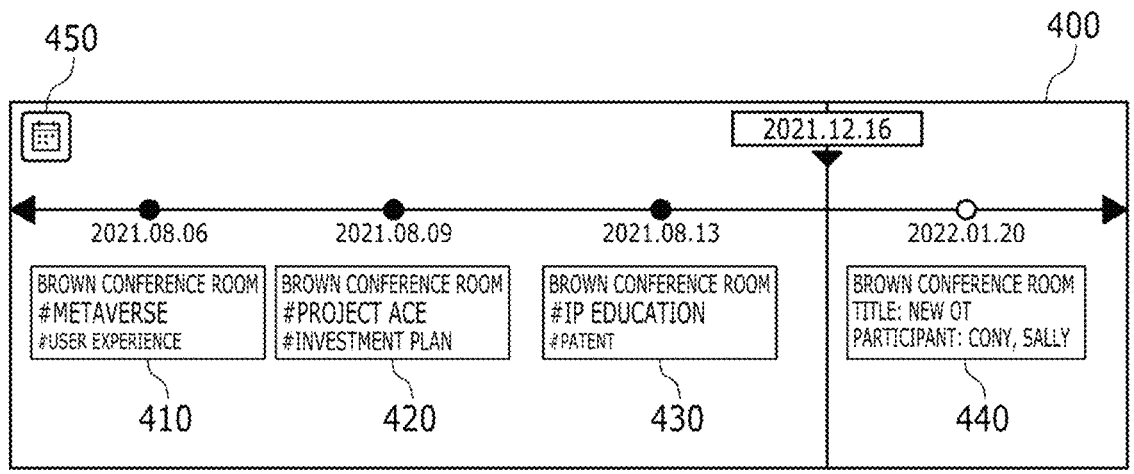
FIG. 4 is a diagram illustrating an example of a user interface including a plurality of point-in-time information.

FIG. 4 is a diagram illustrating an example of a user interface 400 including a plurality of point-in-time information.

Referring to FIG. 4, the user interface 400 may be displayed on the display of the user terminal 110, 210 in response to the user selecting the graphical object (or, alternatively, the icon) associated with the movement between point-in-times. The user interface 400 may be displayed in response to a user input selecting the graphical object associated with the movement between point-in-times, and may include a plurality of point-in-time information 410, 420, 430, and 440 associated with a specific virtual space (e.g., a virtual space in which the graphical object associated with the movement between point-in-times by the user is displayed). In this case, the plurality of point-in-time information may include, based on the current point-in-time (e.g., 2021.12.16), one or more past points-in-time (e.g., 2021.08.06, 2021.08.09, and 2021.08.13) or one or more future points-in-time (e.g., 2022.01.20). In this case, the future point-in-time may be associated with a scheduled future event.

The past point-in-time information 410, 420, and 430 of the plurality of point-in-time information may include date information of a specific past point-in-time and a set of keywords associated with the corresponding virtual space at the specific past point-in-time. For example, as illustrated, the first past point-in-time information 410 may include date information "2021.08.06", a virtual space "Brown conference room", and keywords "#metaverse" and "#user experience". In addition, the second past point-in-time information 420 may include date information "2021.08.09", a virtual space "Brown conference room", and keywords "#project Ace" and "#investment plan". Likewise, the third past point-in-time information 430 may include date information "2021.08.13", a virtual space "Brown conference room", and keywords "#IP education", and "#patent".

In some example embodiments, the user terminal 210 and/or the information processing system 230 may automatically extract the set of keywords from voice data or text data included in the avatar motion data in the virtual space recorded at the corresponding point-in-time. For the voice data, a speech-to-text (STT) technique may be used to extract text. In addition, a keyword extraction model may be used to extract a set of keywords from the text.

The user terminal 210 may display the keywords in the set of keywords in different sizes on the user interface 400 according to the frequency of mention. For example, as illustrated, if the frequency of mention of "metaverse" in the avatar voice data/text data recorded in the first past point-in-time information 410 is high, "metaverse" displayed on the user interface 400 may be enlarged. Meanwhile, if "user experience" is mentioned less than "metaverse", "user experience" may be displayed smaller than "metaverse" on the user interface 400. With such a configuration, the user can easily check the topic of conversation and the like at each point-in-time.

The future point-in-time information 440 of the plurality of point-in-time information may include date information of a specific point-in-time in the future and a set of keywords associated with the scheduled future event. In this case, the set of keywords may be a title of a scheduled future event or keywords extracted from the title. Additionally, the future point-in-time information 440 may include information on an expected participant of the scheduled event. For example, as illustrated, the future point-in-time information 440 may include date information "2022.01.20", a virtual space "Brown conference room", and keywords "Title: New OT", and "Participants: Cony, Sally".

The user may select one of the plurality of point-in-time information included in the user interface 400. In response to the user's selection, if the selected specific point-in-time is a past point-in-time, the user terminal may play back an event associated with the virtual space recorded at the corresponding past point-in-time. On the other hand, if the selected specific point-in-time is a future point-in-time, the user terminal may display an avatar and a virtual environment associated with one or more expected participants in an event associated with the virtual space at the future point-in-time.

The user interface 400 may be displayed in the form of a calendar. For example, in response to a user input for selecting a graphical object 450 (or, alternatively, an icon) that is in the form of calendar, the user terminal 210 may display a plurality of point-in-time information in the form of calendar. In this case, date information of a specific point-in-time, a set of related keywords, and the like may be displayed in an area of the corresponding date.

Figure 5:
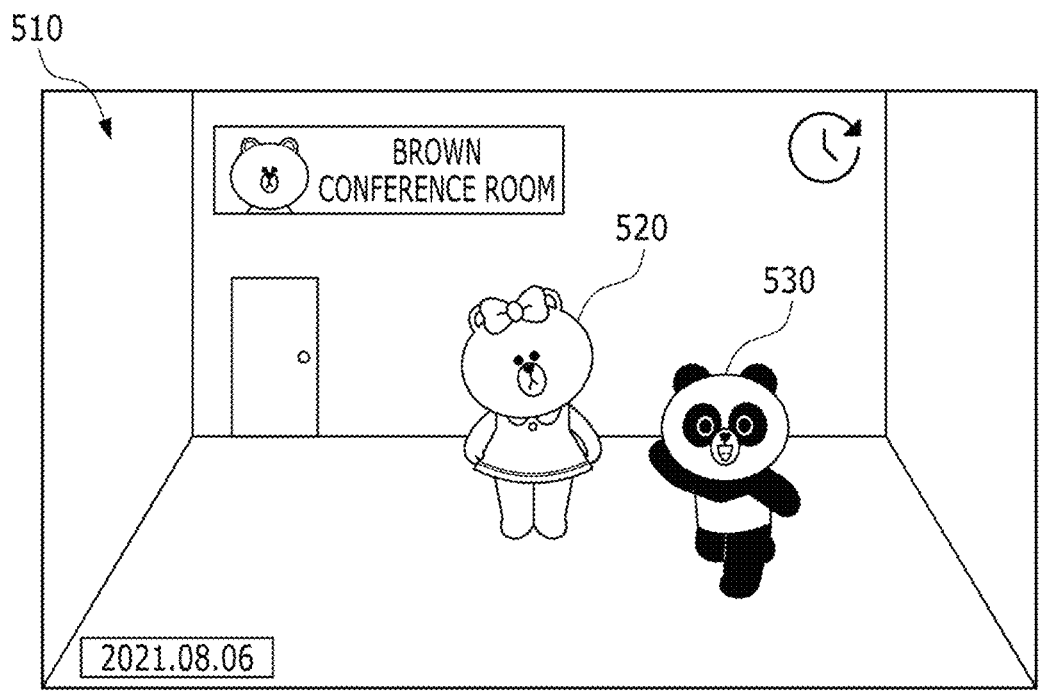
FIG. 5 is a diagram illustrating an example in which an event associated with a virtual space recorded at a specific past point-in-time is played back.

FIG. 5 is a diagram illustrating an example in which an event associated with a virtual space recorded at a past point-in-time is played back.

Referring to FIG. 5, if the user selects a past point-in-time (e.g., a first point-in-time) from among a plurality of point-in-time information included in the user interface, the user terminal may play back a first event associated with a first virtual space 510 recorded at the first point-in-time. In this case, the first event may include the first virtual space 510 recorded at the first point-in-time, and motion data for a first set of avatars 520 and 530 in the first virtual space. In this case, the first set of avatars may include the first avatar 520 and the second avatar 530. For example, as illustrated, if the user selects a specific past point-in-time (e.g., 2021.8.6), the user terminal may display the first avatar 520 and the second avatar 530 associated with the first virtual space (e.g., Brown conference room) 510 recorded in "2021.8.6", and play back motion data associated with the first avatar 520 and the second avatar 530.

The user terminal may further display an avatar (not illustrated) of the user who plays back the first event, together with the first virtual space 510 (e.g., Brown conference room) recorded at the first point-in-time (e.g., "2021.8.6") and the motion data for the first avatar 520 and the second avatar 530 in the first virtual space. In this case, the voices of the first avatar 520 and the second avatar 530 may be output in different sizes according to the relative distances from the user's avatar (not illustrated). For example, as the user's avatar (not illustrated) approaches the first avatar 520, the output voice of the first avatar 520 may become louder, and as the user's avatar moves further away from the first avatar 520, the output voice of the first avatar 520 may become softer. Likewise, as the user's avatar (not illustrated) approaches the second avatar 530, the output voice of the second avatar 530 may become louder, and as the user's avatar (not illustrated) moves further away from the second avatar 530, the output voice of the second avatar 530 may become softer.

FIG. 5 illustrates that the first avatar 520 and the second avatar 530 are avatars of other users other than the user of the terminal device 210, but aspects are not limited thereto. For example, if the user's avatar is included in the first virtual space at the first point-in-time, one of the first avatar 520 and the second avatar 530 may be the user's avatar.

Figure 6:
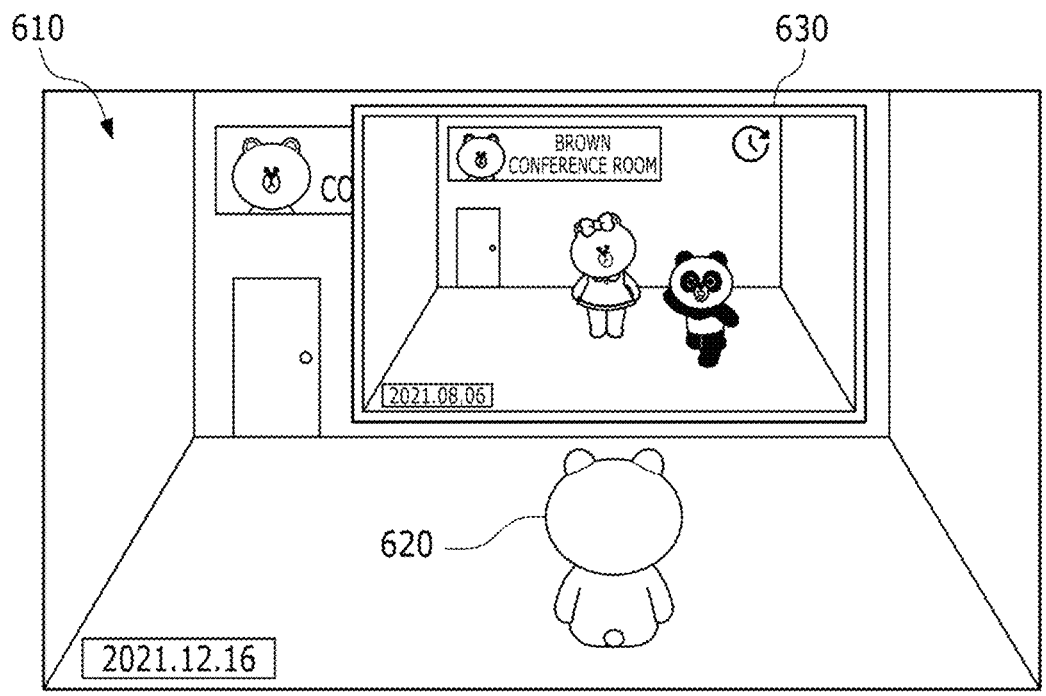
FIG. 6 is a diagram illustrating an example in which an event associated with a virtual space recorded at a specific past point-in-time is played back in a predefined area.

FIG. 6 is a diagram illustrating an example in which an event associated with a virtual space recorded at a specific past point-in-time is played back in a predefined area in the virtual space.

Referring to FIG. 6, if the user selects a specific past point-in-time (e.g., a first point-in-time) from among a plurality of point-in-time information included in the user interface, the user terminal 210 may play back the first event associated with the first virtual space recorded at the first point-in-time in a defined (or, alternatively, a predefined) area 630 in a first virtual space 610. In this case, a user's avatar 620 may be displayed as watching the first event of the past time from the current time through a large display (e.g., a television, a projector, and the like).

For example, as illustrated, a first event associated with the first virtual space (e.g., Brown conference room) 610 recorded at a first point-in-time (e.g., 2021.8.6) may be played back in the predefined area 630 in the first virtual space (e.g., Brown conference room) 610 at the current point-in-time (e.g., 2021.12.16), and the user's avatar 620 may be displayed as watching the first event played back in the predefined area 630.

Figure 7:
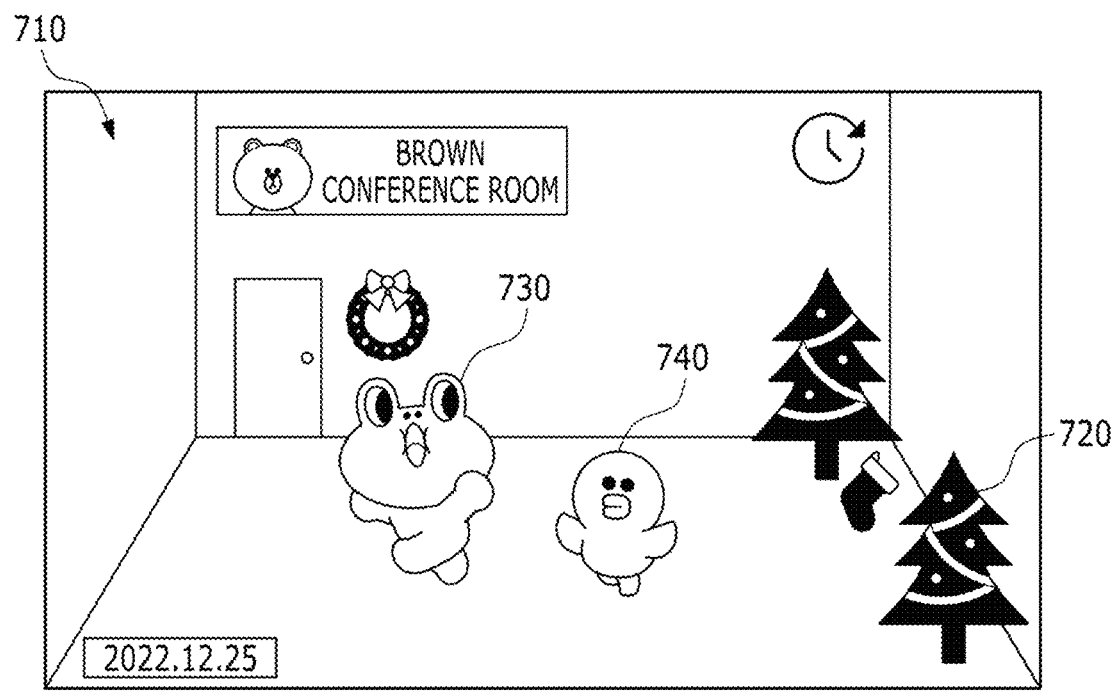
FIG. 7 is a diagram illustrating an example in which avatars and a virtual space associated with an event scheduled for a specific future point-in-time are displayed.

FIG. 7 is a diagram illustrating an example in which an avatar and a virtual space associated with an event scheduled for a future point-in-time are displayed.

Referring to FIG. 7, if the user selects a future point-in-time (e.g., a second point-in-time) from among a plurality of point-in-time information included in the user interface, the user terminal may display a second set of avatars 730 and 740 associated with the expected participants at the second point-in-time, on the first virtual space associated with the second point-in-time. In this case, the second point-in-time may be a point-in-time associated with a future scheduled second event.

For example, as illustrated, if the user selects a future specific point-in-time (e.g., 2021.12.25), the user terminal may display the third avatar 730 and the fourth avatar 740 who are the expected participants in "2021.12.25", in the first virtual space (e.g., Brown conference room) associated with the point-in-time of "2021.12.25".

The first virtual space of the second point-in-time may be configured differently from the first virtual space of the current point-in-time. For example, a user (e.g., any one user of the expected participants) or an administrator associated with the second event scheduled at the second point-in-time may configure the first virtual space of the second point-in-time differently from the first virtual space at the current point-in-time by arranging an item 720 and the like.

Figure 8:
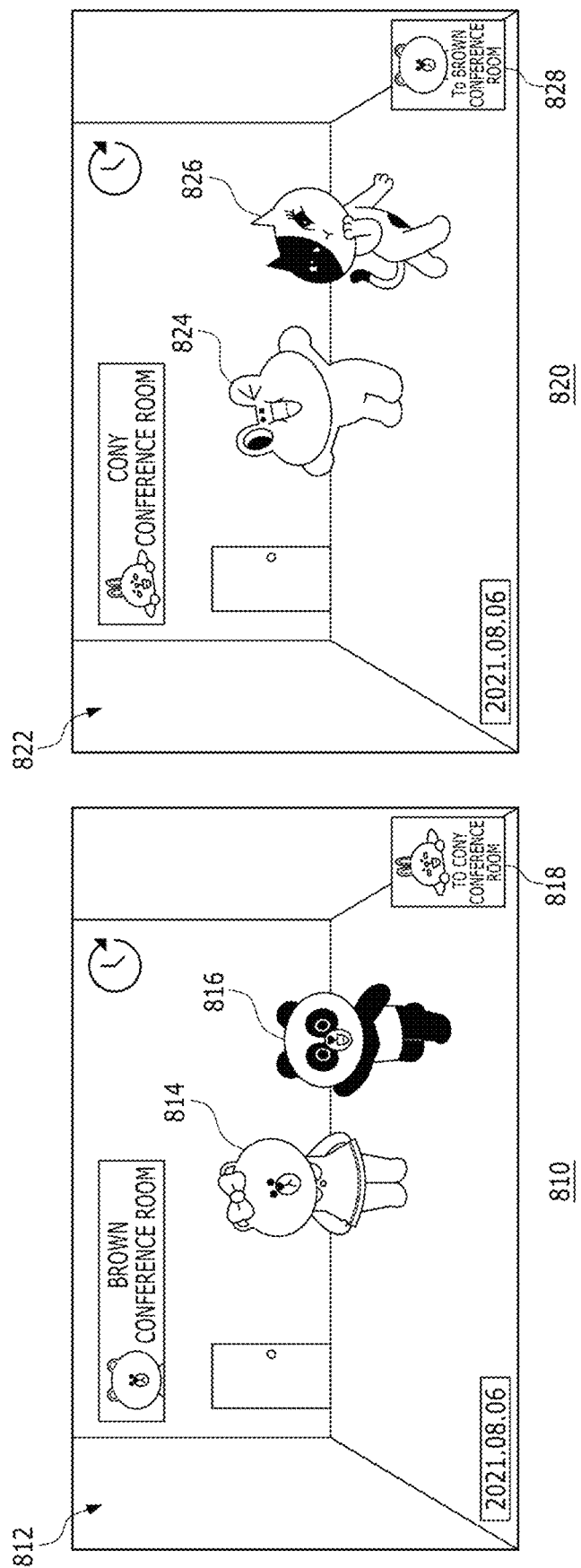
FIG. 8 is a diagram illustrating an example of playing back an event associated with a second virtual space, while playing back an event associated with a first virtual space recorded at a specific past point-in-time.

FIG. 8 is a diagram illustrating an example of playing back an event associated with a second virtual space 822, while playing back an event associated with a first virtual space 812 recorded at a past point-in-time.

Referring to FIG. 8, as illustrated, through a first state 810 and a second state 820, while playing back an event (e.g., first event) associated with the first virtual space 812 recorded at a past point-in-time (e.g., a first point-in-time), the user may play back an event (e.g., a third event) associated with the second virtual space 822 recorded at the first point-in-time. In this case, graphical objects 818 and 828 (or, alternatively, icons) associated with the movement (e.g., teleport) between virtual spaces may be activated, for example, by a user who has the user rights to move between virtual spaces.

The first state 810 is an example of a state in which the graphical object 818 associated with a movement to a second virtual space is displayed together with the playback of the first event associated with the first virtual space 812 recorded at the first point-in-time. For example, the graphical object 818 associated with the movement to the second virtual space may be displayed on the display of the user terminal together with the first virtual space 812 and the first set of avatars 814 and 816 in the first virtual space recorded at the first point-in-time (e.g., 2021.8.6). While the first event is being played back, the user may select the graphical object 818 associated with the movement to the second virtual space.

The second state 820 represents an example in which the third event associated with the second virtual space 822 recorded at the first point-in-time is played back in response to the user selecting the graphical object 818. For example, the second virtual space 822 recorded at the first point-in-time (e.g., 2021.8.6) and a third set of avatars 824 and 826 in the second virtual space may be displayed on the display of the user terminal. At this time, the graphical object 828 associated with the movement to the first virtual space may be displayed together on the screen. While the third event is being played back, the user may play back the first event again by selecting the graphical object 828 associated with the movement to the first virtual space. With this configuration, the user can easily play back the second event associated with the second virtual space recorded at the first point-in-time by selecting the graphical object 818 once. If the user does not have the right to move between the virtual spaces, he or she may end playing back the first event to return to the current time, move from the first virtual space to the second virtual space, and change the current time to the past time to play back the second event.

Figure 9:
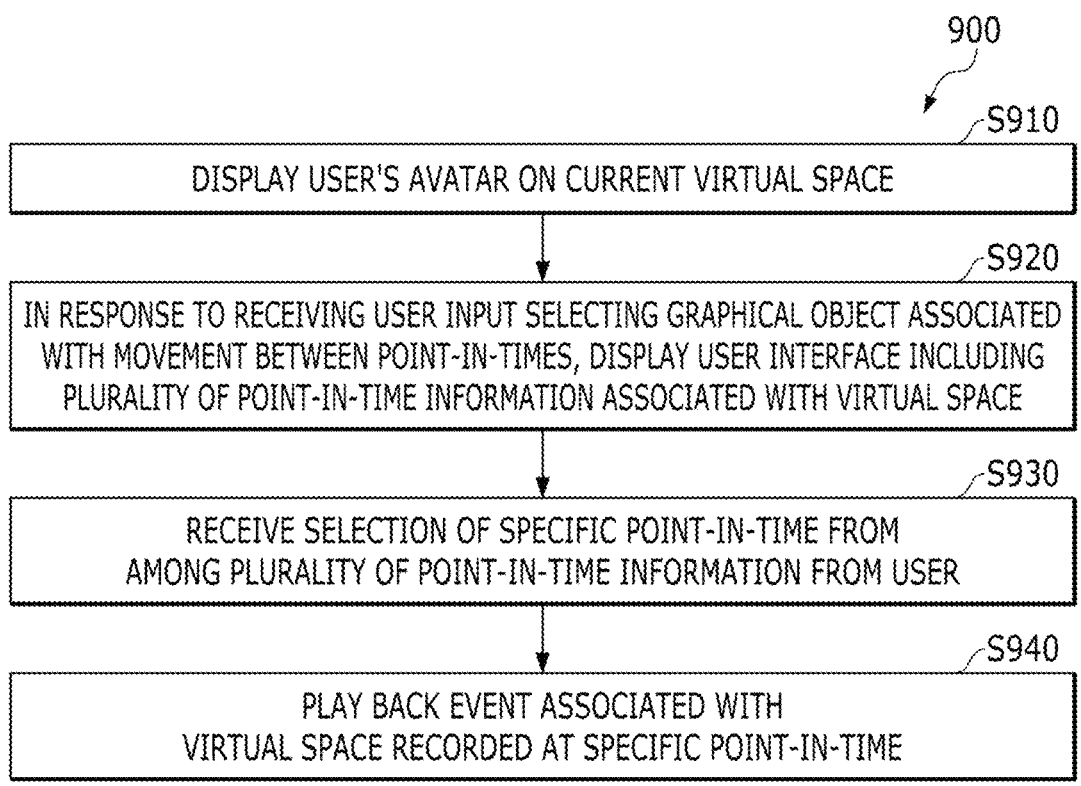
FIG. 9 is a flowchart illustrating a method for displaying a virtual space at various point-in-times.

FIG. 9 is a flowchart illustrating a method 900 for displaying a virtual space at various point-in-times.

Referring to FIG. 9, the method 900 may be performed by one or more processors 314 of the user terminal 210.

In operation S910, the method 900 may be initiated by the processor 314 instructing the user terminal 210 to display the user's avatar on the current virtual space (e.g., the first virtual space).

In operation S920, in response to receiving a user input (e.g., a first user input) selecting a graphical object (e.g., a first graphical object) associated with the movement between point-in-times, the processor 314 may display a user interface including a plurality of point-in-time information associated with the virtual space.

In operation S930, the processor 314 may receive a selection of a specific point-in-time (e.g., a first point-in-time) among a plurality of point-in-time information from the user. In this case, the first point-in-time may be a past point-in-time, and the user interface may display date information of the first point-in-time and a first set of keywords associated with the first virtual space at the first point-in-time. In this case, the first set of keywords may be keywords extracted from voice data or text data included in a first set of avatar motion data in the first virtual space recorded at the first point-in-time. Each of the first set of keywords may be displayed in different sizes on the user interface according to the frequency of mention.

In operation S940, the processor 314 may play back an event (e.g., a first event) associated with a virtual space (e.g., the first virtual space) recorded at a specific point-in-time (e.g., the first point-in-time). In this case, the first event may include the first virtual space recorded at the first point-in-time and motion data for the first set of avatars in the first virtual space. The processor 314 may display the first virtual space recorded at the first point-in-time and motion data for the first set of avatars in the first virtual space together with the user's avatar. In this case, the first set of avatars may include a first avatar and a second avatar, and as the user's avatar approaches the first avatar, the output voice of the first avatar may become louder, and as the user's avatar moves away from the second avatar, the output voice of the second avatar may become softer. Alternatively, the processor 314 may display the user's avatar watching the first event being played back in a predefined area in the current first virtual space.

Additionally, the processor 314 may receive, from the user, a selection for a second point-in-time from among the plurality of point-in-time information. The processor 314 may display a second set of avatars associated with the expected participants at the second point-in-time, on the first virtual space associated with the second point-in-time. In this case, the second point-in-time is associated with a future scheduled second event, and the user interface may display date information of the second point-in-time and a second set of keywords associated with the second scheduled event.

Additionally, in response to receiving a second user input selecting a second graphical object associated with a movement to the second virtual space during the playback of the first event, the processor 314 may play back the third event associated with the second virtual space recorded at the first point-in-time. In this case, the third event may include the second virtual space recorded at the first point-in-time and motion data for the third set of avatars in the second virtual space. The second graphical object may be activated if the user has a first type of right to use.

Additionally, in response to receiving a third user input selecting a third graphical object associated with an event recording, the processor 314 may start recording the current first virtual space and motion data of a fourth set of avatars in the current first virtual space. In this case, the third graphical object may be activated if the user has a second type of right to use.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality.

Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with processors, DSPs, ASICs, FPGAs or other programmable logic devices, discrete gate or transistor logic, discrete hardware components, or any combination of those designed to perform the functions described herein. The processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce, while discs optically play back data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method of displaying a virtual space at various point-in-times using one or more processors of a user terminal, the method comprising:
    displaying a user's avatar on a first virtual space;
    displaying a user interface including a plurality of point-in-time information associated with the first virtual space, in response to receiving a first user input selecting a first graphical object associated with a movement between the various point-in-times;
    receiving, from a user, a selection of a first point-in-time from among the plurality of point-in-time information; and
    replaying a first event associated with the first virtual space recorded at the first point-in-time, the first event including the first virtual space recorded at the first point-in-time and motion data for a first set of avatars in the first virtual space, and
    wherein the first point-in-time is a past point-in-time occurring prior to a current point-in-time, and
    the replaying comprises:
    replaying the first event such that the first virtual space includes therein date information of the first point-in-time and a first set of keywords associated with the first virtual space at the first point-in-time, and
    the method further comprises:
    extracting the first set of keywords from one or more of voice data or text data included in a first set of the motion data in the first virtual space recorded at the first point-in-time.

2. The method according to claim 1, wherein the replaying comprises:
  displaying each of the first set of keywords in different sizes on the user interface according to a frequency of mention.

3. The method according to claim 1, wherein the replaying the first event comprises:
  replaying the first event within a defined area within the first virtual space with the user's avatar displayed within the first virtual space outside of the defined area such that the user's avatar appears to be watching the first event being played back in the defined area in the first virtual space.

4. The method according to claim 1, wherein the replaying the first event comprises:
  displaying the first virtual space recorded at the first point-in-time and the motion data for the first set of avatars in the first virtual space, together with the user's avatar.

5. The method according to claim 4, wherein the first set of avatars includes a first avatar and a second avatar, and the replaying comprises:
  adjusting an output volume of voices of the first avatar and the second avatar based on a distance between the user's avatar and respective ones of the first avatar and the second avatar.

6. The method according to claim 1, further comprising:
  receiving, from the user, a selection of a second point-in-time from among the plurality of point-in-time information associated with the first virtual space; and
  displaying a second set of avatars associated with an expected participant at the second point-in-time, on the first virtual space associated with the second point-in-time.

7. The method according to claim 1, further comprising:
  replaying another event associated with a second virtual space recorded at the first point-in-time, in response to receiving a user input selecting a graphical object associated with a movement to the second virtual space during the replaying of the first event, the another event including the second virtual space recorded at the first point-in-time and motion data for another set of avatars in the second virtual space.

8. The method according to claim 7, further comprising:
  determining whether the user has user rights associated with switching between virtual spaces; and
  activating the graphical object associated with the movement to the second virtual space, in response to the user input selecting the graphical object associated with the movement to the second virtual space during the replaying of the first event, if the user has the user rights associated with switching between the virtual spaces.

9. The method according to claim 1, further comprising:
  initiating recording of the first virtual space and motion data of a set of avatars in the first virtual space, in response to receiving a user input selecting a graphical object associated with an event recording.

10. The method according to claim 9, further comprising:
  determining whether the user has user rights associated with the event recording; and
  activating the graphical object associated with the event recording, only if the user has the user rights associated with the event recording.

11. A non-transitory computer-readable recording medium storing instructions that, when executed by one or more processors, cause performance of the method according to claim 1.

12. A method of displaying a virtual space at various point-in-times using one or more processors of a user terminal, the method comprising:
  displaying a user's avatar on a first virtual space;
  displaying a user interface including a plurality of point-in-time information associated with the first virtual space, in response to receiving a first user input selecting a first graphical object associated with a movement between the various point-in-times;
  receiving, from a user, a selection of a first point-in-time from among the plurality of point-in-time information;
  replaying a first event associated with the first virtual space recorded at the first point-in-time, the first event including the first virtual space recorded at the first point-in-time and motion data for a first set of avatars in the first virtual space,
  receiving, from the user, a selection of a second point-in-time from among the plurality of point-in-time information associated with the first virtual space; and
  displaying a second set of avatars associated with an expected participant at the second point-in-time, on the first virtual space associated with the second point-in-time, and
  wherein the second point-in-time is associated with a scheduled second event scheduled to occur after a current point-in-time, and the displaying the user interface comprises:
  displaying, on the user interface, date information of the second point-in-time and a second set of keywords associated with the scheduled second event.

13. A user terminal, comprising:
  a communication device;
  a memory; and
  one or more processors connected to at least the memory, the one or more processors configured to execute one or more computer-readable programs included in the memory to configure the user terminal to display a virtual space at various point-in-times by,
  displaying a user's avatar on a first virtual space,
  displaying a user interface including a plurality of point-in-time information associated with the first virtual space, in response to receiving a first user input selecting a first graphical object associated with a movement between the various point-in-times,
  receiving, from a user, a selection of a first point-in-time from among the plurality of point-in-time information, and
  replaying a first event associated with the first virtual space recorded at the first point-in-time, the first event including the first virtual space recorded at the first point-in-time and motion data for a first set of avatars in the first virtual space,
  wherein the first point-in-time is a past point-in-time occurring prior to a current point-in-time, and
  the replaying comprises:
  replaying the first event such that the first virtual space includes therein date information of the first point-in-time and a first set of keywords associated with the first virtual space at the first point-in-time, and
  wherein the one or more processors are configured to execute the one or more computer-readable programs to further configure the user terminal to,
  extract the first set of keywords from one or more of voice data or text data included in a first set of the motion data in the first virtual space recorded at the first point-in-time.

14. The user terminal according to claim 13, wherein the one or more processors are configured to execute the one or more computer-readable programs to further configure the user terminal to, receive, from the user, a selection of a second point-in-time from among the plurality of point-in-time information associated with the first virtual space, and display a second set of avatars associated with an expected participant at the second point-in-time, on the first virtual space associated with the second point-in-time.

15. The user terminal according to claim 14, wherein the second point-in-time is associated with a scheduled second event scheduled to occur after a current point-in-time, and the user interface is configured to display date information of the second point-in-time and a second set of keywords associated with the scheduled second event.

16. The user terminal according to claim 13, wherein the one or more processors are configured to execute the one or more computer-readable programs to further configure the user terminal to, replay another event associated with a second virtual space recorded at the first point-in-time, in response to receiving a user input selecting a graphical object associated with a movement to the second virtual space during the replaying of the first event, the another event including the second virtual space recorded at the first point-in-time and motion data for another set of avatars in the second virtual space.

17. The user terminal according to claim 13, wherein the one or more processors are configured to execute the one or more computer-readable programs to further configure the user terminal to, initiate recording the first virtual space and motion data of a set of avatars in the first virtual space, in response to receiving a user input selecting a graphical object associated with an event recording.

\* \* \* \* \*